United States Patent [19]

Böhm et al.

[11] Patent Number: 5,338,589

[45] Date of Patent: Aug. 16, 1994

[54] POLYETHYLENE MOLDING COMPOSITION

[75] Inventors: Ludwig Böhm, Hattersheim am Main; Hans-Frieder Enderle, Frankfurt am Main; Horst Jarstrow, Kelkheim, all of Fed. Rep. of Germany

[73] Assignee: Hoechst Aktiengesellschaft, Frankfurt, Fed. Rep. of Germany

[21] Appl. No.: 893,322

[22] Filed: Jun. 3, 1992

[30] Foreign Application Priority Data

Jun. 5, 1991 [DE] Fed. Rep. of Germany ....... 4118378

[51] Int. Cl.$^5$ .................. C08L 23/06; C08L 23/08; C08L 23/18
[52] U.S. Cl. .................. 428/36.9; 525/240; 525/322; 525/88
[58] Field of Search .................. 525/240, 88, 322, 324; 428/36.9

[56] References Cited

U.S. PATENT DOCUMENTS

| | | | |
|---|---|---|---|
| 3,392,213 | 7/1968 | Berger | 525/240 |
| 3,914,342 | 10/1975 | Mitchell | 525/240 |
| 4,374,227 | 2/1983 | Michie, Jr. | 525/240 |
| 4,414,369 | 11/1983 | Kuroda et al. | |
| 4,550,143 | 10/1985 | Tanaka et al. | |
| 4,786,688 | 11/1988 | Thiersault et al. | |
| 4,824,912 | 4/1989 | Su | |
| 4,859,749 | 8/1989 | Franke | 526/124 |
| 4,954,391 | 9/1990 | Kotani et al. | |
| 5,026,610 | 6/1991 | Harrison | |
| 5,043,204 | 8/1991 | Itaba et al. | |

FOREIGN PATENT DOCUMENTS

| | | |
|---|---|---|
| 1106521 | 8/1981 | Canada . |
| 0052555 | 5/1982 | European Pat. Off. . |
| 0129312 | 12/1984 | European Pat. Off. . |
| 0134427 | 3/1985 | European Pat. Off. . |
| 61-043639 | 3/1986 | Japan . |
| 02235947 | 9/1990 | Japan . |
| 843697 | 8/1960 | United Kingdom . |
| 860329 | 2/1961 | United Kingdom . |
| 944208 | 12/1963 | United Kingdom . |
| 2148906 | 6/1985 | United Kingdom . |
| 90/03414 | 4/1990 | World Int. Prop. O. . |

OTHER PUBLICATIONS

Kirk–Othmer–Ency. of Chem. Tech. vol. 16 3rd Edition (1991) p. 435.
Boenig Polyolefins: Structure and Properties–1966 p. 57.
Modern Plastics–1963 Ed–p. 227–1962.

*Primary Examiner*—Carman J. Seccuro, Jr.
*Attorney, Agent, or Firm*—Connolly and Hutz

[57] ABSTRACT

A polyethylene molding composition which consists of 50 to 80% by weight of a HD polyethylene having a very broad bimodal molecular mass distribution and 20 to 50% by weight of a chemical LLD polyethylene or LD polyethylene gives pipes, plates and sheets which have very good long-term and low-temperature characteristics.

15 Claims, No Drawings

POLYETHYLENE MOLDING COMPOSITION

DESCRIPTION

The invention relates to a polyethylene molding composition which consists of two different types of polyethylene and is suitable for the production of gas pipes, landfill belts and sheets with very good characteristics.

The preparation of blends from high density polyethylene (HDPE) and linear low density polyethylene (LLDPE) for the preparation of medium density polyethylene (MDPE) in order to obtain molding compositions with improved characteristics is known (cf. GB 843,697, GB 860,329, GB 944,208, U.S. Pat. No. 4,374,227, CA 1,106,521). The high density polyethylene used in these blends has a monomodal molecular mass distribution.

It has now been found that the characteristics of polyethylene blends can be further improved if the high density polyethylene used is a high density polyethylene having a bimodal molecular mass distribution.

The invention therefore relates to a polyethylene molding composition having a density (23° C.) of 0.930 to 0.940 g/cm³ and a MFI 190/2.16 of 0.05 to 1.0 g/10 min, consisting of 50 to 80% by weight of a HD polyethylene having a density (23° C.) of 0.940 to 0.960 g/cm³, a MFI 190/2.16 of 0.01 to 0.5 g/10 min and a broad bimodal molecular mass distribution and 20 to 50% by weight of a polyethylene having a low density (23° C.) of 0.910 to 0.930 g/cm³ and a MFI 190/2.16 of 0.5 to 2.0 g/10 min.

The polyethylene molding composition according to the invention consists of a high density polyethylene (HDPE) and a low density polyethylene, preferably a linear low density polyethylene (LLDPE).

The HD polyethylene has a density (23° C.) of 0.940 to 0.960, preferably 0.940 to 0.950 g/cm³ and a MFI 190/2.16 of 0.01 to 0.8, preferably 0.1 to 0.5 g/10 min. It also has a very broad bimodal molecular mass distribution and can contain small proportions of propylene, but-1-ene, pent-1-ene or hex-1-ene monomer units.

The bimodality can be described as a measure of the position of the centers-of-mass of the two individual molecular mass distributions with the aid of the coefficients viscosity number (VN according to ISO/R 1191) of the polymers formed in the two polymerization stages. The $VN_1$ of the polyethylene formed in the first stage is 40 to 80 cm³/g and the VN of the end product is in the range from 270 to 330 cm³/g. The $VN_2$ of the polyethylene formed in the second stage can be calculated from the following equation:

$$VN_2 = \frac{VN_{end\ product} - w_1 VN_1}{1 - w_1}$$

where $w_1$ is the proportion by weight (% by weight) of the ethylene polmerized in the first stage, with respect to the total ethylene polymerized in both stages. $VN_2$ is as a rule 480 to 580 cm³/g.

The HD polyethylene is obtained by suspension, solution or gas phase polymerization of ethylene, optionally in the presence of small amounts of $C_3$- to $C_8$-1-olefins, at a temperature of 20° to 120° C. and under a pressure of 2 to 60 bar in the presence of a Ziegler catalyst, which consists of a transition metal compound and an organoaluminum compound. The polymerization is carried out in two stages. The molecular mass is controlled with the aid of hydrogen.

The proportion of hydrogen in the gas space of the first reactor is 80±5% by volume and that in the gas space of the second reactor is 6±4% by volume.

A typical example for the preparation of a suitable HD polyethylene is described below:

A catalyst is first prepared. To this end, 114.3 g of magnesium ethylate are dispersed in 1 dm³ of a diesel oil fraction, under $N_2$ blanketing, in a 3 l four-necked round bottom flask fitted with a dropping funnel, a precision glass stirrer, a reflux condenser and a thermometer. 474 g of titanium tetrachloride are added dropwise to this dispersion, while passing through a gentle stream of $N_2$, in the course of 2 h at 100° C. The reaction mixture is then washed at 100° C. with diesel oil until the supernatant solution contains no further titanium. 38 g of titanium tetrachloride are now added dropwise at 140° C. in the course of 1 h and the batch is stirred for a further 60 h while passing a gentle stream of $N_2$ over the mixture. The reaction product is then washed with the abovementioned diesel oil fraction until the supernatant solution contains no further titanium.

After drying, the solid (component A) has approximately the following analytical composition:
Ti 5.1% by weight
Mg 20.8% by weight
Cl 71.7% by weight 39.9 g of component A are suspended in 150 cm³ of diesel oil, and 100 cm³ of an isoprenylaluminum solution, which contains 0.5 mol of isoprenylaluminum/dm³, are added at 20° C. with stirring. About 35% by weight of the tetravalent titanium is reduced to titanium (III) by this means.

This catalyst component is used in a continuous two-stage process for the polymerization of ethylene.

Typical operating data are (Table 1):

TABLE 1

|  | Reactor 1 (120 dm³) | Reactor 2 (120 dm³) |
| --- | --- | --- |
| Temperature | 83° C. | 83° C. |
| Catalyst feed | 2.5 mmol/h | 15 mmol/h |
| Dispersant (diesel oil) | 25 dm³/h | 50 dm³/h |
| Ethylene | 7 kg/h | 8 kg/h |
| Hydrogen in the gas space | 80% by volume | 6% by volume |
| Total pressure | 10 bar | 2.5 bar |

A polymer prepared under these operating conditions using triisobutylaluminum as cocatalyst had the following product characteristics:

| Powder: | viscosity number (ISO R 1191) | 300 cm³/g |
| --- | --- | --- |
|  | MFI 190/5 | 0.65 g/10 min |
|  | MFI 190/2.16 | 0.19 g/10 min |
|  | density (23° C.) | 0.944 g/cm³/g |
| Granules: | MFI 190/5 | 0.45 g/10 min |
|  | MFI 190/2.16 | 0.12 g/10 min |
|  | density (23° C.) | 0.94 g/cm³/g |

The low density polyethylene has a density (23° C.) of 0.910 to 0.925, preferably 0.915 to 0.925 g/cm³ and a MFI 190/2.16 of 0.5 to 2.0 g/10 min. Preferably, a linear low density polyethylene (=LLDPE) having a narrow, unimodal molecular mass distribution is used. Small amounts of other monomer units which are derived from propylene, but-1-ene, pent-1-ene, hex-1-ene, hept-1-ene or oct-1-ene or 4-methylpent-1-ene can be incorporated in the polymer chain.

Suitable linear low density polyethylenes (LLDPE) are obtained by polymerization using transition metal catalysts. They are commercially available. Suitable products are listed in Table 2.

TABLE 2

|  | Preparation process | Density (23° C.) g/cm$^3$ | MFI 190/2.16 g/10 min |
|---|---|---|---|
| Product 1 | Low pressure (LLDPE) | 0.923 | 1.15 |
| Product 2 | Low pressure (LLDPE) | 0.920 | 1.0 |
| Product 3 | Low pressure (LLDPE) | 0.919 | 0.88 |
| Product 4 | Low pressure (LLDPE) | 0.919 | 1.02 |
| Product 5 | Low pressure (LLDPE) | 0.917 | 0.89 |
| Product 6 | High pressure (LDPE) | 0.924 | 0.99 |

A suitable high pressure low density polyethylene is also available commercially. It is also listed in Table 2.

The HD polyethylene to LD polyethylene ratio in the molding composition according to the invention is 50:50 to 80:20, preferably 60:40 to 75:25.

In addition to the polyethylenes, the molding composition according to the invention can also contain the customary additives, for example a) heat stabilizers, antioxidants, UV absorbers, light stabilizers, metal deactivators, compounds which destroy peroxide and basic costabilizers and b) fillers, reinforcing agents, plasticizers, lubricants, emulsifiers, pigments, fluorescent brighteners, flame retardants, antistatic agents or propellants.

The various additives of the abovementioned group a) are added to the molding composition in an amount of from 0.01 to 10, preferably 0.01 to 5% by weight, based on the total weight of the molding composition. The proportion of the additives of group b) is 1 to 80, preferably 10 to 50% by weight, based on the total molding composition.

The molding composition according to the invention is prepared by the methods customary for processing plastics, for example by granulating granule/granule or granule/powder mixtures with the possible addition of additives.

The molding composition has a density (23° C.) of 0.930 to 0.940 g/cm$^3$ and a MFI 190/2.16 of 0.05 to 1.0, preferably 0.1 to 1.0 g/10 min and meets the requirements for a thermoplastic material classified P23 in accordance with ASTM D 1248 having a yield stress >18 MPa (>12 MPa in accordance with ASTM D 1248 and measured in accordance with DIN 53455) and an elongation at break of >700% (>400% in accordance with ASTM D 1248 and measured in accordance with DIN 53455) and a brittleness temperature of <−60° C. (measured in accordance with ASTM D 746). The material also displays exceptional resistance to slow crack propagation (ESCR).

The pipes produced from the molding composition using conventional processes have excellent characteristics:

processing very good
pipe surface very good
Mechanical properties:
Young's modulus (DIN 53475)≈620 MPa notched impact strength $a_n$≈15–35 mJ/mm$^2$ at 0° C.
(DIN 53453 U-notch)
Long-term characteristic (stress-rupture PN10 32/3 mm pipe)
according to DIN 8075
service life ($\sigma$=4 MPa, 80° C.)>5000 h The invention is illustrated in more detail by the following examples.

EXAMPLE 1

67 parts by weight of powder of a HD polyethylene having a bimodal molecular mass distribution, 33 parts by weight of granules of a but-1-ene/4-methylpent-1-ene/ethylene terpolymer (product 1) having a unimodal molecular mass distribution, 0.05 part by weight of pentaerythritol tetrakis[3-(3,5-di-t-butyl-4-hydroxyphenyl)-propionate], 0.1 part by weight of tris(2,4-di-t-butylphenyl) phosphite and 0.2 part by weight of Ca stearate were mixed and granulated under blanketing inert gas using a twin-screw extruder (D=53 mm, L=10 D; T=210°–240° C.).

The polymer data were:
HDPE:
Density=0.944 g/cm$^3$
MFI 190/2.16=0.23 g/10 min
MFI 190/5=0.70 g/10 min
LLDPE:
Density=0.923 g/cm$^3$
MFI 190/2.16=1.15 g/10 min
MFI 190/5=3.18 g/10 min Test pieces were prepared from the granules and the tests indicated in Table 3 were carried out. The results are also summarized in Table 3.

EXAMPLE 2

65 parts by weight of granules of a HD polyethylene having a bimodal molecular mass distribution, 35 parts by weight of granules of an oct-1-ene/ethylene copolymer (product 2) having a unimodal molecular mass distribution and the stabilizers according to Example 1 were mixed and processed to granules analogously to Example 1.
HDPE:
Density=0.944 g/cm$^3$
MFI 190/2.16=0.16 g/10 min
MFI 190/5=0.62 g/10 min
LLDPE:
Density=0.920 g/cm$^3$
MFI 190/2.16=1.0 g/10 min
MFI 190/5=3.15 g/10 min The test results are summarized in Table 3.

EXAMPLE 3

65 parts by weight of powder of a HD polyethylene having a bimodal molecular mass distribution, 35 parts by weight of granules of an oct-1-ene/ethylene copolymer (product 2) having a unimodal molecular mass distribution and the stabilizers according to Example 1 were mixed and processed to granules analogously to Example 1. HDPE:
Density=0.944 g/cm$^3$
MFI 190/2.16=0.2 g/10 min
MFI 190/5=0.80 g/10 min
LLDPE:
Density=0.920 g/cm$^3$
MFI 190/2.16=1.0 g/10 min
MFI 190/5=3.15 g/10 min The test results are summarized in Table 3.

EXAMPLE 4

PN10 pipes were produced from the molding compositions according to Examples 1 to 3 on a pipe installation. The machine data were:
Extruder D=48 mm, L=24.4 D
Die mandrel φ 26.5 mm, orifice φ 32.1 mm
Vacuum calibration
Cooling bath length 3 m, temperature about 15° C.

The target temperature in the extruder was 200° C. The extruder was operated at various speeds of rotation and the throughput, the mass pressure and the mass temperature were measured. The values are summarized in Table 4.

EXAMPLE 5

The pipes produced in accordance with Example 4 were subjected to a stress-rupture test in accordance with DIN 8075. The service life times thereof were as follows for the pipes produced from the molding composition
according to Example 1>4800 h,
according to Example 2>5000 h and
according to Example 3>4000 h.

TABLE 3

| Characteristic | | Test method | Example 1 | Example 2 | Example 3 |
|---|---|---|---|---|---|
| Density | g/cm$^3$ | DIN 53479 | 0.938 | 0.935 | 0.935 |
| VN | cm$^3$/g | ISO/R 1191 | 290 | 270 | 260 |
| MFI 190/2.16 | g/10 min | DIN 53735 | 0.23 | 0.30 | 0.31 |
| MFI 190/5 | | | 0.93 | 1.13 | 1.15 |
| MFI 190/21.6 | | | 18.2 | 19.0 | 18.6 |
| MFR 21.6/5 | | | 19.6 | 16.8 | 16.2 |
| Young's modulus | MPa | DIN 53457-t | 643 | 636.4 | 618.4 |
| Flexural creep modulus | MPa | DIN 54852 (1 min) | 804 | 766 | 751 |
| Yield stress | MPa | DIN 53455 ISO/R 527 | 19.9 | 18.7 | 18.6 |
| Elongation at yield stress | % | 125 mm/min | 9.1 | 11.6 | 10.3 |
| Tear strength | MPa | Test piece 3 | 38.6 | 34.7 | 37.5 |
| Elongation at break | % | | 793.7 | 740.0 | 749.7 |
| a$_n$ | | | | | |
| 23° C. | mJ/mm$^2$ | Notched impact strength | 18.8 | n.f.** | n.f.** |
| 0° C. | | U-notch DIN 53453 | 16.1 | 28.6 | 36.6 |
| −20° C. | | (Pressed standard small rod) | 10.4 | 13.2 | 13.5 |
| Bell test 100° C. | h | ASTM D 1693 C | >1000 | >1000 | >1000 |
| Tear test 80° C. | h | 5 MPa, glycol | 379 ± 128 | >2000 | >2000 |
| OIT 200° C. | min | ISO/IC 138 | 48 | 28.5 | 23.6 |

*Resistance to stress cracking: service like of samples of square cross-section notched all round
**No fracture

TABLE 4

| | | Example 1 | Example 2 | Example 3 |
|---|---|---|---|---|
| n = 50 min$^{-1}$ | | | | |
| T$_m$ | °C. | 221 | 223 | 223 |
| P | bar | 115 | 110 | 110 |
| Q | kg/h | 21.7 | 22.1 | 21.9 |
| N/Q | kWh/kg | 0.203 | 0.214 | 0.216 |
| n = 80 min$^{-1}$ | | | | |
| T$_m$ | °C. | 227 | 228 | 229 |
| P | bar | 135 | 135 | 135 |
| Q | kg/h | 34.5 | 35.2 | 34.6 |
| N/Q | kWh/kg | 0.209 | 0.207 | 0.214 |
| n = 110 min$^{-1}$ | | | | |
| T$_m$ | °C. | 231 | 233 | 233 |
| P | bar | 155 | 155 | 158 |
| Q | kg/h | 47.4 | 47.1 | 47.9 |
| N/Q | kWh/kg | 0.219 | 0.22 | 0.216 | n speed of rotation
Q throughput
P mass pressure
T$_m$ mass temperature
N power consumption

We claim:
1. A polyethylene molding composition having a density (23° C.) of 0.930 to 0.940 g/cm$^3$, and a MFI 190/2.16 of 0.05 to 1.0 g/10 min, comprising 50 to 80% by weight of a HD polyethylene having a density (23° C.) of 0.940 to 0.960 g/cm$^3$, a MFI 190/2.16 of 0.01 to 0.5 g/10 min and a broad bimodal molecular mass distribution, wherein said HD polyethylene is produced by a two-stage polymerization process, said polymerization process having a first stage producing a first polymer, and a second stage producing an end polymer, wherein the polymer of the first stage has a viscosity number of 40 to 80 cm$^3$/g and the end polymer after the second stage has a viscosity number of 270 to 330 cm$^3$/g and 20 to 50% by weight of a linear polyethylene having a low density (23° C.) of 0.910 to 0.925 g/cm$^3$ and a MFI 190/2.16 of 0.5 to 2.0 g/10 min.

2. The polyethylene molding composition as claimed in claim 1, which has been prepared by mixing and granulating the constituents.

3. The polyethylene molding composition as claimed in claim 1, wherein the high density polyethylene has a density at 23° C. of 0.940 to 0.950 g/cm$^3$ and an MFI 190/2.16 of 0.1 to 0.5 g/10 min., and the low density polyethylene has a density at 23° C. of 0.915 to 0.925 g/cm$^3$.

4. The polyethylene molding composition as claimed in claim 1, wherein the high density polyethylene was obtained from ethylene which was copolymerized with a minor amount of at least one $C_3$- to $C_8$-1-olefin.

5. The polyethylene molding composition as claimed in claim 1, wherein the ratio of high density polyethylene to low density polyethylene in the molding composition is 60:40 to 75:25.

6. A granulated polyethylene molding composition as claimed in claim 1, consisting essentially of: 50 to 80% by weight of said HD polyethylene, optionally containing a minor amount of units derived from propylene, but-1-ene, pent-1-ene or hex-1-ene monomer, 20 to 50% by weight of said polyethylene having a low density, optionally containing a minor amount of units derived from propylene, but-1-ene, pent-1-ene, hex-1-ene, hept-1-ene or oct-1-ene or 4-methylpent-1-ene monomer, and optionally, one or more of the following additional ingredients: (a) a heat stabilizer, an antioxidant, a UV absorber, a light stabilizer, a metal deactivator, a compound which destroys peroxide, or a basic costabilizer, or (b) a filler, a reinforcing agent, a plasticizer, a lubricant, an emulsifier, a pigment, a fluorescent brightener, a flame retardant, an antistatic agent, or a propellant.

7. The polyethylene molding composition as claimed in claim 6, wherein at least one ingredient from group (a) is present and at least one ingredient from group (b) is present, the amount of group (a) additive or additives being 0.01 to 10% by weight, and the amount of group (b) additive or additives being 1 to 80% by weight, based on the total molding composition.

8. The polyethylene molding composition as claimed in claim 7, wherein the amount of group (a) additive or additives is 0.01 to 5% by weight, and the amount of group (b) additive or additives is 10 to 50% by weight, on the same basis.

9. A pipe, landfill belt, or sheet formed from the composition of claim 1.

10. The polyethylene molding composition as claimed in claim 1, wherein the composition has a density of 0.930 to 0.938 g/cm$^3$.

11. The polyethylene molding composition as claimed in claim 1, wherein the composition has a density of 0.930 to 0.935 g/cm$^3$.

12. The polyethylene molding composition as claimed in claim 1, wherein the composition has a density of 0.935 to 0.938 g/cm$^3$.

13. The process of making the medium density polyethylene blend having a bimodal molecular weight distribution claimed in claim 1, comprising forming a polymer of a high density polyethylene with a bimodal molecular weight distribution by a first polymerization step and a second polymerization step, wherein the polymer formed by the first polymerization step has a viscosity number of 40 to 80 cm$^3$/gm, and the polymer after the second polymerization step has a viscosity number of 270 to 330 cm$^3$/gm, a MFI of 190/2.16 of 0.01 to 0.5 g/10 min, and a density between 0.940 and 0.960/cm$^3$, blending 50–80% by weight of said bimodal molecular weight high density polyethylene with 20–50% by weight of a linear low density polyethylene having a density between 0.910 and 0.925 g/.cm$^3$, and a MFI 190/2.16 of 0.5 to 2.0 g/10 min to form a medium-density polyethylene having a density of 0.930 to 0.940 g/cm$^3$ and a MFI 190/2.16 of 0.05 to 1.0 g/cm$^3$.

14. The process of claim 13, wherein the medium density polyethylene has a density between 0.930 and 0.938 g/cm$^3$.

15. The process of claim 13, wherein the medium density polyethylene has a density of between 0.930 and 0.935 g/cm$^3$.

* * * * *